Patented Oct. 29, 1940

2,219,575

UNITED STATES PATENT OFFICE 2,219,575

CATALYST AND PROCESS FOR MAKING OLEFIN OXIDES

Raymond W. McNamee and Henry C. Chitwood, Charleston, and George H. Law, South Charleston, W. Va., assignors to Carbide and Carbon Chemicals Corporation, a corporation of New York No Drawing. Application June 16, 1939, Serial No. 279,494

9 Claims. (Cl. 260—348)

This invention is directed to a process for activating silver surface catalysts such as those which may be employed in effecting the direct combination of olefins with molecular oxygen to form olefin oxides. This unique addition reaction and the use of surface catalysts essentially comprising silver to aid it are disclosed by Lefort Re. 20,370 and form no part of the present invention. Also, as shown by Lefort, this reaction proceeds at temperatures between 150° and 400° C., and in the presence of inert diluents, such as nitrogen, if desired.

The comprehensive object of the present invention is to provide a convenient and economical method for activating silver surface catalysts by the employment of reagents solely in the gaseous state. More narrowly expressed, activation in situ of such silver catalysts as may have become deactivated during use constitutes an important feature of the present invention.

Silver surface catalysts are activated according to the present discovery by an initial treatment which we believe converts at least a part of the surface of the silver catalyst to a silver halide. This may be done by subjecting the silver surface catalyst at a temperature between about 150° and about 450° C. to the action of vapors of a halogen-containing organic substance which, at these temperatures, is capable of releasing its halogen to the silver. Alternatively, the silver surface catalyst may be treated at any convenient temperature with the vapors of the halogens themselves. As a result of this treatment, at least part of the silver surface is converted to a silver halide, in which form it displays little, if any, catalytic activity in effecting the direct combination of olefins with oxygen to form olefin oxides.

The next step in the activation is to subject the silver halide formed as a result of the above halogenation to the action of water vapor and an olefin oxide at an elevated temperature of about 150° C. to about 450° C., preferably about 250° C. to 275° C. As a consequence of this step, a reaction is believed to take place as represented by the equation below, where X is halogen and R is hydrogen or a lower alkyl radical.

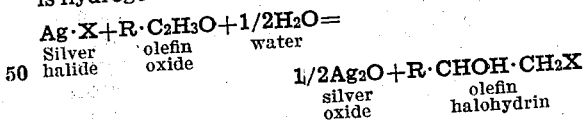

If the temperature employed in this step is above about 170° C., the approximate dissociation temperature of silver oxide, or if an oxidizable gas such as ethylene is present at even lower temperatures, the silver oxide formed immediately dissociates or is reduced to elemental silver, thus regenerating immediately the active silver surface catalyst. The active silver surface catalyst thus regenerated exhibits substantially the same, or even a higher, degree of activity than the initial catalyst prior to its having become deactivated.

Although there is very good reason to believe that the activation proceeds according to the principles set forth above, it is understood that this invention is not to be limited by any statements of theory or explanation in either the preceding or subsequent sections. The invention consists of the steps of activating a silver catalyst as herein described irrespective of the mechanism by which the process may operate.

Activation according to this invention may also be applied to those forms of silver which, either because they do not possess a silver surface or because they have too smooth a silver surface initially display slight activity in effecting the union of an olefin, such as ethylene, with oxygen to form ethylene oxide. For example, a sample of silver powder, which originally was incapable of producing ethylene oxide at temperatures below 300° C., was activated by alternate halogenation and treatment with ethylene oxide and water vapor to form a silver surface catalyst capable of forming effective yields of ethylene oxide.

Within the above-designated scope of the invention, there exist several favored embodiments. The halogens which may be employed in the first step of the activation are, in decreasing order of preference, chlorine, bromine, iodine, and fluorine. However, the use of vapors of halogen-containing organic substances is preferred to the use of the halogens themselves. This is because the halogens themselves are extremely reactive with silver and, with the introduction of the appropriate amount of halogen for the treatment, the silver halide formed is distributed unevenly throughout the catalyst bed, being concentrated in the first portion of the catalyst chamber. It has been found that the employment of the halogen-containing organic substances obviates this disadvantage, a more even distribution of the silver halide throughout the catalyst bed being obtained.

Halogen-containing organic substances which may be used are those which, at the temperature of the treatment, are capable of being vaporized and are susceptible to decomposition with the probable release of free halogen or hydrogen halide, or mixtures of these materials. Examples of these halogen-containing substances are chloroform, ethylene dichloride, trichlorethylene, propylene dichloride, chlor-acetone, chloro-benzene, chloro-phenol, chloro-naphthalene and dichloro-benzene. Corresponding compounds of bromine, iodine, and fluorine, in decreasing order of preference, may also be employed. Of all the above compounds, the use of ethylene dichloride is preferred.

The silver surface catalyst to be activated is desirably maintained on a catalyst support. Artificial silica filter stone, sandstone or one of the commercially available ceramically bonded fused alumina refractory materials, when crushed and screened to a convenient size, are examples of suitable catalyst supports.

Activation according to this invention is also applicable to those silver surface catalysts which have been promoted by incorporating with them one or more of the oxides, hydroxides, or peroxides of barium, lithium, or strontium. These promoting compounds undergo analogous reactions in the activation cycle, being first converted to the corresponding halide, and then, by the treatment with olefin oxide and water vapor, being converted back to the corresponding hydroxide. The oxides and peroxides can probably not be regenerated by this treatment, but this is of little significance since the hydroxides of these compounds serve equally well as promotors. The incorporation of these promoting compounds with the silver surface catalysts forms no part of the present invention.

Several examples will now be given to illustrate the practice of the invention.

Example I

Seventy-two parts of silver oxide were deposited on 220 parts of ceramically bonded fused aluminum oxide. Two hundred cubic centimeters of this supported catalyst were placed in a reaction tube having a diameter of one inch. A mixture of air and ethylene, containing 10% by volume of ethylene, was passed over the catalyst at the rate of 50 liters per hour. Ethylene oxide was formed in 43% yield at a temperature of 240° C. indicating the initial activity of the catalyst.

Ethylene dichloride was then introduced into the feed gases in relatively large amounts and the catalyst became deactivated, producing ethylene oxide in but 8% yield at 240° C. Reduction of the catalyst with hydrogen at 275° C. was then resorted to in an effort to restore activity and this expedient was only partly successful.

The catalyst was then deactivated by passing chlorine into the air feed at the rate of 300 bubbles (about 20 cc.) per minute for 10 minutes. During this chlorination the ethylene feed was stopped. As a result of the chlorination, the catalyst became almost completely inactive, being capable of effecting only 1.7% yield of ethylene oxide at 240° C. Attempted reduction with hydrogen was completely ineffective in restoring activity.

Reactivation of the catalyst according to the present invention was then applied. In doing this, the vapors resulting from evaporation of a solution of 1 part by weight of ethylene oxide in 3 parts by weight of water were passed over the catalyst at a temperature of 275° C., one liter of the solution being consumed in five hours. At the end of this period the activity of the catalyst was restored, the reactivated catalyst effecting a 33% yield of ethylene oxide at 240° C.

Example II

A catalyst similar to that described in Example I was prepared and ethylene oxide was produced by reacting ethylene with oxygen under the conditions specified in the preceding example. The catalyst was initially very active. During operation, 19.9 grams of ethylene dichloride vapors were passed over the catalyst and it then became deactivated, effecting but 5.3% yield of ethylene oxide at a temperature of 256° C.

Operation was continued under reactivating conditions by including in the feed gases the vapors resulting from the vaporization of a 25% by weight solution of ethylene oxide in water. During the reactivation the catalyst was maintained at a temperature of from 250° C. to 265° C., and 500 c. c. of the ethylene oxide solution were vaporized and passed over the catalyst in a period of 5 hours. At the end of this time the ethylene feed and the introduction of ethylene oxide were discontinued while the temperature was lowered. It was found that the activity of the catalyst had been restored. On resuming the ethylene feed a 24.0% yield of ethylene oxide was effected at 210° C.

In this particular method of carrying out the activation, it is desirable to discontinue the ethylene feed, or to reduce its concentration, while the temperature of the catalyst is being lowered to the selected operating level. This is because the catalyst at the end of the treatment is very active and, if its temperature is above the optimum operating range, the oxidation of the ethylene may proceed so completely that the temperature cannot be controlled. This may result in overheating of the catalyst and in impairment of its activity because of sintering. Over-oxidation of the ethylene during reactivation of the catalyst is not likely to occur because the high concentration of ethylene oxide present exerts an inhibiting effect on the oxidation.

Example III

This example illustrates the reactivation of a promoted silver catalyst. Such a catalyst was prepared by incorporating 9 parts of barium dioxide with 90 parts of silver oxide and supporting the mixture on 265 parts of 2 to 4 mesh ceramically bonded fused aluminum oxide. The supported catalyst was placed in a tube having a diameter of one inch and a mixture of air and ethylene containing 10% ethylene was passed over the catalyst at a temperature of 181° C. The catalyst was initially very active, effecting a 28% yield of ethylene oxide.

Ethylene dichloride, in amount greater than 0.1% by volume of the reactants, was permitted to pass over the catalyst during operation. Its catalytic activity then became reduced, effecting an 11% yield of ethylene oxide at a temperature of 202° C. Operation was then ceased and the vapors resulting from the vaporization of a 25% by weight solution of ethylene oxide in water were passed over the deactivated catalyst at a temperature of approximately 250° C., 500 c. c. of the solution being consumed in 5 hours. At the end of this period the activity of the catalyst was found to have been substantially restored. It effected a 20% yield of ethylene oxide at a temperature of 171° C.

The invention may also be practiced in other ways than described in the foregoing examples. For instance, it has been found that the silver surface catalyst may be maintained in a high state of activity during actual operation by continuously, or intermittently, including a small amount of the vapors of the halogens or the halogen-containing organic substances with the reactants and additionally providing that water vapor be present during operation. As a result of this inclusion and provision, three chemical reactions are believed to occur simultaneously, namely, reaction of the silver with halogen to form silver halide, reaction of olefin with oxygen to form olefin oxide, and the subsequent reaction of the olefin oxide with the silver halide to regenerate the silver surface catalyst. The silver halide exists in small amount only, although for a finite period of time. The net effect of these reactions is to maintain the catalytic activity for an indefinite period of time and to increase actually the activity of catalysts of initial low activity as pointed out before.

In carrying out the above embodiment of the invention, it is desirable to control carefully the amount of halogen or halogen-containing organic substance introduced with the reactants. Such control is needed in order that the catalyst is not over-halogenated and its activity correspondingly diminished for an appreciable period of time before it will again become reactivated. Whatever may be the explanation, it has been found as a fact that higher yields of olefin oxide are obtained under otherwise similar conditions when the vapors of halogens or halogen-containing organic substances are included in the reactants, and the presence of water vapor additionally provided, than when these substances are not included.

Modifications of the invention other than as disclosed above will be readily apparent to those skilled in the art and are included within the invention as defined in the appended claims.

What is claimed is:

1. The process of activating a silver catalyst which comprises treating said catalyst with the vapors of one of the group consisting of halogens and halogen-containing organic substances, and thereafter bringing the halogen treated catalyst in contact with water vapor and the vapor of an olefin oxide.

2. The process of activating a silver catalyst which comprises treating said catalyst with the vapors of one of the group consisting of halogens and halogen-containing organic substances, and thereafter forming a silver surface catalyst by bringing said halogen treated catalyst in contact with water vapor and the vapor of an olefin oxide at a temperature of between about 150° C. and 450° C.

3. The process of activating a silver surface catalyst which comprises treating said catalyst at a temperature between about 150° C. and 450° C. with the vapors of one of the group consisting of halogens and halogen-containing organic substances, and thereafter bringing the halogen treated catalyst in contact with water vapor and the vapor of an olefin oxide at a temperature between about 150° C. and about 450° C.

4. The process of activating a silver surface catalyst which comprises treating said catalyst at a temperature between about 150° C. and about 450° C. with the vapors of one of the group consisting of halogens and halogen-containing organic substances, and thereafter bringing said halogen treated catalyst in contact with water vapor and the vapor of ethylene oxide at a temperature of between about 150° C. and about 450° C.

5. The process of activating a silver surface catalyst capable of effecting the direct chemical combination of ethylene with molecular oxygen to form ethylene oxide which comprises treating said catalyst at a temperature between about 150° C. and about 450° C. with the vapors of chlorine and one of the group consisting of chlorine and chlorine-containing organic substances to form silver chloride, and thereafter regenerating the silver surface catalyst by bringing said chlorinated catalyst in contact with water vapor and the vapors of ethylene oxide at a temperature between about 150° C. and about 450° C.

6. The process of activating a silver surface catalyst capable of effecting the direct chemical combination of ethylene with molecular oxygen to form ethylene oxide which comprises treating said catalyst at a temperature between about 150° C. and about 450° C. with the vapors of ethylene dichloride to form silver chloride, and thereafter regenerating the silver surface catalyst by bringing said chlorinated catalyst in contact with water vapor and the vapors of ethylene oxide at a temperature between about 150° C. and about 450° C.

7. In a process for making ethylene oxide by the direct combination of ethylene with molecular oxygen in the presence of a silver surface catalyst at a temperature between 150° C. and 400° C., the step of activating the catalyst in situ which comprises passing over the said catalyst the vapors of one of the group consisting of halogens and halogen-containing organic substances, and thereafter bringing the halogenated catalyst in contact with water vapor and the vapor of ethylene oxide at a temperature between 150° C. and 450° C.

8. In a process for making ethylene oxide by the direct combination of ethylene with molecular oxygen in the presence of a silver surface catalyst at a temperature between 150° C. and 400° C., the step of activating the catalyst in situ which comprises passing over the said catalyst the vapors of one of the group consisting of chlorine and chlorine-containing organic substances to form silver chloride on the surface of at least a part of said catalyst, and thereafter regenerating the silver surface catalyst by bringing the chlorinated catalyst in contact with water vapor and the vapor of ethylene oxide at a temperature between 150° C. and 450° C.

9. In a process for making ethylene oxide by the direct combination of ethylene with molecular oxygen in the presence of a silver surface catalyst at a temperature between 150° C. and 400° C., the step of activating the catalyst in situ which comprises passing over said catalyst the vapors of ethylene dichloride to form silver chloride on the surface of at least a part of said catalyst and thereafter regenerating the silver surface catalyst by bringing the chlorinated catalyst in contact with water vapor and the vapor of ethylene oxide at a temperature between 150° C. and 450° C.

RAYMOND W. McNAMEE.
HENRY C. CHITWOOD.
GEORGE H. LAW.